US007774408B2

(12) United States Patent
Sinha et al.

(10) Patent No.: US 7,774,408 B2
(45) Date of Patent: Aug. 10, 2010

(54) METHODS, SYSTEMS, AND EMAILS TO LINK EMAILS TO MATTERS AND ORGANIZATIONS

(75) Inventors: Pradeep Sinha, Burnsville, MN (US); Shal Jain, New Brighton, MN (US); Thomas F. Brennan, Plymouth, MN (US); Steven W. Lundberg, Edina, MN (US)

(73) Assignee: FoundationIP, LLC, Minneapolis, MN (US)

( * ) Notice: Subject to any disclaimer, the term of this patent is extended or adjusted under 35 U.S.C. 154(b) by 2219 days.

(21) Appl. No.: 10/128,141

(22) Filed: Apr. 23, 2002

(65) Prior Publication Data

US 2002/0178229 A1 Nov. 28, 2002

Related U.S. Application Data

(60) Provisional application No. 60/285,842, filed on Apr. 23, 2001, provisional application No. 60/335,732, filed on Oct. 18, 2001.

(51) Int. Cl.
*G06F 15/16* (2006.01)

(52) U.S. Cl. .................................. 709/206; 726/26

(58) Field of Classification Search ................. 709/206, 709/219, 228, 229; 707/1, 7, 101, 530; 705/8, 705/1; 370/352; 345/738; 726/26
See application file for complete search history.

(56) References Cited

U.S. PATENT DOCUMENTS

| 5,175,681 | A |   | 12/1992 | Iwai et al. |
| 5,329,447 | A |   | 7/1994 | Leedom, Jr. |
| 5,423,043 | A | * | 6/1995 | Fitzpatrick et al. .......... 719/317 |
| 5,758,354 | A |   | 5/1998 | Huang et al. |
| 5,819,269 | A | * | 10/1998 | Uomini ......................... 707/7 |
| 5,867,579 | A |   | 2/1999 | Saito ............................ 380/25 |
| 5,875,431 | A |   | 2/1999 | Heckman et al. |
| 5,923,845 | A |   | 7/1999 | Kamiya et al. ......... 395/200.36 |
| 5,923,848 | A | * | 7/1999 | Goodhand et al. .......... 709/219 |
| 5,946,697 | A |   | 8/1999 | Shen |
| 6,057,841 | A |   | 5/2000 | Thurlow et al. ............. 345/347 |
| 6,128,730 | A |   | 10/2000 | Levine ........................... 713/1 |
| 6,135,646 | A |   | 10/2000 | Kahn et al. ............. 395/200.47 |
| 6,161,149 | A | * | 12/2000 | Achacoso et al. .............. 710/4 |

(Continued)

FOREIGN PATENT DOCUMENTS

WO    WO-01/24035    4/2001

(Continued)

OTHER PUBLICATIONS

"CPI News", *Computer Packages, Inc.*, (Fall, 2001), 4 pages.

(Continued)

*Primary Examiner*—Philip C Lee
*Assistant Examiner*—Grant Ford
(74) *Attorney, Agent, or Firm*—Kendal M. Sheets (57) ABSTRACT

Methods, systems, and electronic mail messages (emails) are provided for automatically linking emails to matters or organizations. An email is received or constructed and linked to matters or organizations. The matters and the organizations are associated with matter areas and organization areas. Each of the areas includes matter data, organization data, personnel data, assignment data, and contact data. In one embodiment, the email is also interfaced to a billing system, a document management system, and a docketing system.

31 Claims, 5 Drawing Sheets

U.S. PATENT DOCUMENTS

| | | | |
|---|---|---|---|
| 6,237,040 B1* | 5/2001 | Tada | 709/246 |
| 6,249,807 B1* | 6/2001 | Shaw et al. | 709/206 |
| 6,249,844 B1 | 6/2001 | Schloss et al. | |
| 6,250,930 B1* | 6/2001 | Mintz | 434/323 |
| 6,252,963 B1 | 6/2001 | Rhoads | 380/54 |
| 6,256,676 B1 | 7/2001 | Taylor et al. | 709/246 |
| 6,295,541 B1 | 9/2001 | Bodnar et al. | |
| 6,327,594 B1 | 12/2001 | Van Huben et al. | 707/200 |
| 6,330,589 B1 | 12/2001 | Kennedy | 709/206 |
| 6,369,840 B1* | 4/2002 | Barnett et al. | 715/853 |
| 6,374,246 B1 | 4/2002 | Matsuo | 707/10 |
| 6,374,252 B1 | 4/2002 | Althoff et al. | 707/102 |
| 6,401,104 B1 | 6/2002 | LaRue et al. | |
| 6,499,021 B1* | 12/2002 | Abu-Hakima | 706/10 |
| 6,549,612 B2* | 4/2003 | Gifford et al. | 379/67.1 |
| 6,549,894 B1 | 4/2003 | Simpson et al. | |
| 6,571,290 B2* | 5/2003 | Selgas et al. | 709/228 |
| 6,574,617 B1 | 6/2003 | Immerman et al. | |
| 6,622,168 B1 | 9/2003 | Datta | |
| 6,636,867 B2 | 10/2003 | Robertson | |
| 6,662,178 B2* | 12/2003 | Lee | 707/3 |
| 6,694,315 B1 | 2/2004 | Grow | |
| 6,697,844 B1 | 2/2004 | Chan | |
| 6,721,747 B2* | 4/2004 | Lipkin | 707/10 |
| 6,766,307 B1* | 7/2004 | Israel et al. | 705/80 |
| 6,839,738 B2 | 1/2005 | Quine et al. | |
| 6,912,582 B2* | 6/2005 | Guo et al. | 709/229 |
| 6,983,308 B1 | 1/2006 | Oberhaus et al. | |
| 7,007,068 B2* | 2/2006 | Morkel | 709/206 |
| 7,010,144 B1* | 3/2006 | Davis et al. | 382/100 |
| 7,069,592 B2* | 6/2006 | Porcari | 726/26 |
| 7,085,755 B2* | 8/2006 | Bluhm et al. | 707/3 |
| 2001/0001864 A1* | 5/2001 | Page et al. | 709/205 |
| 2001/0049617 A1* | 12/2001 | Berenson et al. | 705/8 |
| 2001/0049707 A1* | 12/2001 | Tran | 707/530 |
| 2002/0027901 A1* | 3/2002 | Liu et al. | 370/352 |
| 2002/0032738 A1* | 3/2002 | Foulger et al. | 709/206 |
| 2002/0052769 A1 | 5/2002 | Navani et al. | |
| 2002/0059076 A1 | 5/2002 | Grainger et al. | |
| 2002/0065675 A1 | 5/2002 | Grainger et al. | |
| 2002/0065676 A1 | 5/2002 | Grainger et al. | |
| 2002/0065677 A1 | 5/2002 | Grainger et al. | |
| 2002/0072920 A1 | 6/2002 | Grainger | |
| 2002/0078255 A1 | 6/2002 | Narayan | |
| 2002/0083093 A1* | 6/2002 | Goodisman et al. | 707/511 |
| 2002/0087600 A1* | 7/2002 | Newbold | 707/514 |
| 2002/0087639 A1 | 7/2002 | Quine et al. | |
| 2002/0099711 A1 | 7/2002 | Robertson | |
| 2002/0111824 A1* | 8/2002 | Grainger | 705/1 |
| 2002/0111953 A1* | 8/2002 | Snyder | 707/101 |
| 2002/0116363 A1 | 8/2002 | Grainger | |
| 2002/0116467 A1 | 8/2002 | Boyer et al. | |
| 2002/0133508 A1 | 9/2002 | LaRue et al. | |
| 2002/0138465 A1* | 9/2002 | Lee | 707/1 |
| 2002/0161733 A1 | 10/2002 | Grainger | |
| 2002/0178229 A1 | 11/2002 | Sinha et al. | |
| 2002/0186240 A1* | 12/2002 | Eisenberger et al. | 345/738 |
| 2003/0055828 A1 | 3/2003 | Koch et al. | |
| 2003/0088473 A1 | 5/2003 | Fisher et al. | |
| 2003/0163492 A1 | 8/2003 | Slifer | |
| 2003/0187938 A1 | 10/2003 | Mousseau et al. | |
| 2003/0220891 A1* | 11/2003 | Fish | 707/1 |
| 2004/0049482 A1 | 3/2004 | Brechter et al. | |
| 2004/0054711 A1 | 3/2004 | Multer | |
| 2004/0205537 A1* | 10/2004 | Graham et al. | 715/511 |
| 2005/0044078 A1 | 2/2005 | deVries et al. | |
| 2005/0099963 A1 | 5/2005 | Multer et al. | |
| 2005/0246194 A1 | 11/2005 | Lundberg | |

FOREIGN PATENT DOCUMENTS

| | | |
|---|---|---|
| WO | WO-01/93081 | 12/2001 |
| WO | WO-02/37304 | 5/2002 |

OTHER PUBLICATIONS

"Memotech IP Suite", http://www.cpajersey.com/cpajersey/mis2.htm, [retrieved on Sep. 24, 2002], Computer Patent Annuities (CPA) LP, 3 pages.

"Renewal Services", http://www.cpajersey.com/cpajersey/patent1.htm, [retrieved on Sep. 24, 2002], Computer Patent Annuities (CPA) LP, 5 pages.

Schwegman, M. L., et al., "Using the Internet To Support Your Practice in Minnesota", *Lorman Education Services*, Eau Claire, WI, (Nov. 30, 2000), 82 pages.

Quinn, Brigid, et al., "Secure and Confidential Access to Patent Application Status Now Available on the Internet", *United States Patent & Trademark Office, Press Release #99-50*, obtained from http://www.uspto.gov/web/offices/com/speeches/99-50-2.htm,(Dec. 20, 1999), 1pg.

Anonymous, "Smartmail Knowledge-Based System for the Officevision Desktop", *IBM Technical Disclosure Bulletin*, 33, (Nov. 1, 1990), 1 p.

* cited by examiner

METHODS, SYSTEMS, AND EMAILS TO LINK EMAILS TO MATTERS AND ORGANIZATIONS

This application claims priority to U.S. Provisional Application Ser. No. 60/285,842, filed on Apr. 23, 2001, the specification of which is herein incorporated by reference.

This application claims priority to U.S. Provisional Application Ser. No. 60/335,732, filed on Oct. 18, 2001, the specification of which is herein incorporated by reference.

TECHNICAL FIELD

Embodiments of the present invention relate generally to linking electronic mail messages (emails) and more specifically to automatically associating emails to matters and organizations within an enterprise.

BACKGROUND INFORMATION

Although email systems are pervasive throughout society as a form of electronic communication, attempting to integrate emails into internal enterprise applications has largely not occurred. This is so, because of the large amount of development work can be required to customize and integrate the email systems with proprietary enterprise applications. Moreover, often the email systems are acquired from a third-party vendor, and correspondingly any customization of the email systems is limited to features provided with the acquired email systems. As a result, enterprises have developed ad hoc applications and techniques to provide some level of custom integration between the enterprises' email systems and other internal enterprise specific applications.

Furthermore, an enterprise's work is typically focused on projects or matters, which are not readily identified and associated with any email received within the email system. Thus, to accurately reflect work within the enterprise, email distribution lists (e.g., a group of email addresses) can be established to ensure that any email related to a specific project or matter is properly addressed, sent, and/or received by individuals associated with the specific project or matter. However, each sent and/or received email within the distribution list still must be manually filtered and maintained by each individual represented within the distribution list. And, each individual user implements his/her own filing techniques, if any, on his/her own email client to record or otherwise process the email. As one of ordinary skill in the art readily appreciates, this decentralized approach to managing emails related to projects or matters within the enterprise results in lost communications, and therefore is inefficient for the enterprise.

Additionally, with the abundance of email communications occurring within an enterprise, many individuals become desensitized to a received email and resort to viewing and responding only to emails that are sent from a particular individual. This is particularly true of individuals that hold important positions within the enterprise, since on any given day a large volume of emails are received and need to be processed by these individuals. Further, email systems that add a priority flag to emails or senders who identify subjects of the emails in bold or upper case lettering do little to draw the appropriate attention of individuals whom are inundated with large quantities of emails on a daily basis.

Even when an email is appropriately processed and filed by an individual, the individual finds it difficult to integrate the email into other enterprise applications for subsequent consumption. For example, a received email relating to a specific enterprise matter is typically only accessible from within the enterprise's email system. Therefore, if the individual wants to print off all or selected information for the enterprise's project or matter, then the individual is forced to access a variety of enterprise applications (e.g., email systems, document management systems, billing systems, docketing systems, and the like) to acquire the desired information.

Moreover, emails within an email system are encrypted in a data format understood by the email system. As a result, an individual relies on any available data format conversion utilities that come prepackaged with the email system to translate the emails into a data format that manually permits the emails to be uploaded into other enterprise applications. More often than not, the only available data conversion utility is one that translates the emails to an American Standard Code for Information Interchange (ASCII) or text-readable format. Yet, during this translation much desired data presentation formatting (e.g., justification, bold, underlines, font types, and the like) is completely lost and in some instances characters are incorrectly translated or not represented at all within the translated ASCII format.

Some more astute individuals attempt to copy and paste emails from the email systems to other enterprise applications. But, in some instances the copy command does a standard ASCII conversion, and correspondingly these individuals are no better off than if they had elected to simply translate the emails to ASCII format in the first place, using the available email system's conversion utility. Furthermore, copy commands are restrictive, since only a limited amount of data can be copied to an internal volatile memory buffer of an individual's computing device during a single copy command. As a result, individuals drop or lose data during the copy and paste operations, and often these individuals are not notified of the dropped data. This results in incomplete data transfers from the emails to the desired enterprise applications when using copy and paste commands on emails having large amounts of data.

Accordingly, current email systems are not flexible enough to integrate into an enterprise, since existing email systems do not permit centralized association of emails indicative of an enterprise's work model, do not adequately draw the attention of desensitized users to received emails, and do not integrate emails with existing enterprise applications. Moreover, any conventionally achieved email integration is manually intensive and cumbersome. Therefore, there exists a need for electronic mail systems that seamlessly reflect the enterprise's work model, more appropriately capture the attention of desensitized users upon receipt of emails, and seamlessly integrate emails with the existing enterprise's applications.

DESCRIPTION OF THE EMBODIMENTS

Novel email systems and email integration techniques are described. In the following detailed description of the embodiments, reference is made to the accompanying drawings, which form a part hereof, and in which is shown by way of illustration, but not limitation, specific embodiments of the invention may be practiced. These embodiments are described in sufficient detail to enable one of ordinary skill in the art to understand and implement them, and it is to be understood that other embodiments may be utilized and that structural, logical and electrical changes may be made without departing from the spirit and scope of the present disclosure. The following detailed description is, therefore, not to be taken in a limiting sense, and the scope of the embodiments of the inventions disclosed herein is defined only by the appended claims.

Figure 1:
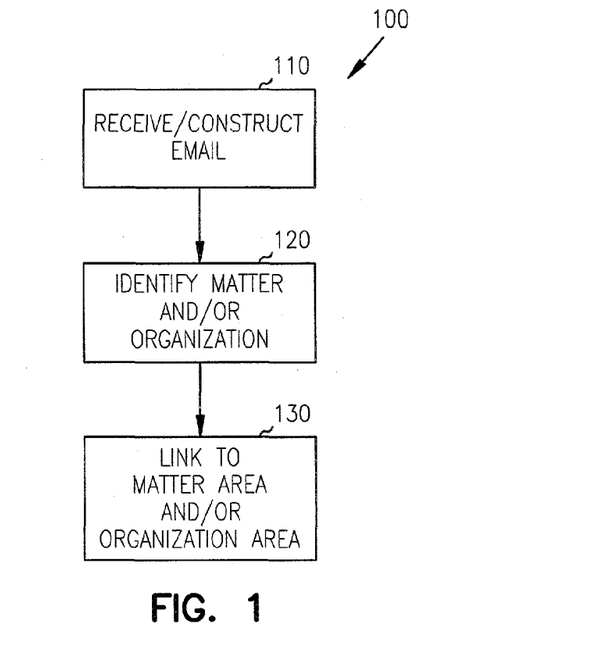
FIG. 1 is a flow diagram of a method to process/construct an email, in accordance with one embodiment of the invention.

FIG. 1 illustrates a flow diagram of one method 100 to process/construct an email, in accordance with one embodiment of the invention. Initially, in one embodiment an email is received in 110. The email can be received by any email system having an email client and an email server, where the email server processes emails being sent by and received by the email client. The email system can be any commercially available email system modified to conform to the tenets of the present specification. Moreover, in one embodiment, the email system is custom developed using the teachings of the present invention and is made available as a series of browser pages displayed in a browser that is connected via the Internet and accessible over the World Wide Web (WWW). Of course as one of ordinary skill in the art readily appreciates, any custom developed email system conforming to the teachings of the present specification, can be implemented using any graphical user interface (GUI) having any network connection to an email server.

The received email includes a matter identification and/or an organization identification. A matter identification is any unique reference used to identify a particular enterprise's scheme for uniquely referencing projects within the enterprise. In one embodiment, the matter identification is a numeric string represented in floating-point format or integer format. The numeric string can also include alphabetic characters, symbol characters, and punctuation characters. In some embodiments, the projects refer to legal matters, such as intellectual property law matters (e.g., patent, copyright, trademark, trade secret, unfair competition, and the like), and the enterprise includes lawyers and clients whom engage the lawyers to perform legal work represented by the legal matters as matter identifications. In this latter embodiment, the clients and lawyers collaborate with each other via a secure extranet using WWW browsers.

An organization identification is any unique reference used to identify a particular organization participating within an enterprise. Similar to the matter identification, the organization identification can be any unique string including numeric characters, alphabetic characters, symbol characters, punctuation characters, or combinations thereof.

Just as a typical email includes metadata identifying a subject of the email, a date the email was received, and a sender identification, the email received in 110 includes the matter identification and/or the organization identification as part of its metadata. However, if the received email lacks a matter identification and/or an organization identification, then the email system of the present specification permits a selectable matter identification and/or organization identification to be assigned and otherwise associated with the received email, which will then become part of the metadata associated with the received email.

Furthermore, in some embodiments, the metadata of the email also includes a matter title description that permits an individual viewing the email to readily discern with more descriptive text an exact enterprise project referred to by an enterprise's unique matter identification. In this way, individuals consuming an email of the present specification are capable of more readily assimilating and processing the significance of the email, since it is rapidly identified with the matter title. As one of ordinary skill in the art readily appreciates, the matter title will increase an individual's sensitivity to the received email, since the individual is capable of rapidly identifying the exact enterprise's project associated with the email by viewing the matter title.

After the email is received and after a matter identification and/or organization identification is acquired (e.g., included within the received email or selected and assigned to the received email), the matter identification and/or organization identification are identified by an email system using the tenets of the present specification. In one embodiment, the email system automatically uses the identified matter identification and/or organization identification to link in 130 (e.g., file) the received email to matter areas and/or organization areas. In another embodiment, the email system prompts an individual to commit the email to the matter areas and/or organization areas before linking in 130 (e.g., file) the received email. In still other embodiments, the email system permits the individual to assign multiple matter identifications and/or organization identifications to the email, and the email system links in 130 (e.g., file) the email to multiple matter areas and/or multiple organization areas.

Matter and Organization areas are logical storage areas; each area is uniquely identified by a corresponding matter identification and/or organization identification. The areas include electronic data related to the matter identification and/or organization identification area. The electronic data can include, by way of example only, contact information, address information, docketing or task information, documents, discussion threads, personnel assignments, budget information, billing information, and others. Furthermore, all data can be readily accessed by activating a link that identifies a particular type of data residing in one of the areas. For example, in a browser, a page presenting a view of an area can include tabs that when activated present a data type (e.g., contact information, address information, docketing or task information, documents, discussion threads, personnel assignments, budget information, billing information, and others). In this way the received email becomes fully integrated with all relevant electronic data related to the received email within the enterprise.

In another embodiment represented by FIG. 1, an email system using the teachings of the present invention permits the construction of a template email in 110 upon receiving a request. The request can be for a reply to an existing email, to forward an existing email, or to create a new email altogether. The template email includes input areas for receiving a matter identification and/or an organization identification. Moreover, in one embodiment, the email system permits an option to create or acquire a new matter identification or a new organization identification. In this latter embodiment, the email system links to a generation set of executable instructions that presents for input a series of input fields required by an enterprise to establish a matter identification and/or organization identification. Further, in one embodiment, an input field permits a matter title to be associated with the template email, or alternatively once a matter identification is acquired the email system automatically acquires the appropriate matter title and populates the matter title input field.

Once a matter identification and/or organization identification are acquired or identified with the template email in 120, the template email can be committed and linked in 130 (e.g., filed) to appropriate matter areas and/or organization areas. The template email is committed when an individual sends the email by activating a send option associated with the email system.

In still other embodiments of FIG. 1, a map is used by a sending and receiving email system, such that the matter identification and/or organization identification of a sending email system can be acquired by the receiving email system to file or link a received email message into the same matter identification and/or organization identification areas identified by the sending email system. As an example, a map could be centrally located on a remote server and accessible to both the sending and receiving email systems. In this way, any sent email message need only have a unique email message identifier, which could then be indexed into the centrally accessible map to acquire one or more matter identifications and/or organization identifications associated with the sent email message. Correspondingly, the email message itself need not physically carry the matter identification and/or organization identification since any unique email message identifier could be used in combination with a centrally accessible map to properly link email messages to the appropriate matter identifications and/or organization identifications. Moreover, this same technique can be used to link and or file additional electronic information associated with an email message, such as document attachments, notes, tasks, calendar information, and the like.

In still other embodiments, a map could be dynamically created or reconstructed by any receiving email system based on meta data contained within the email message, such as email message identifiers, matter identifications and/or organization identifications, subject text, and the like. Upon creating the map from the meta data of the received email message, the receiving email system identifies acceptable matter identifications and/or organization identifications applicable to the receiving email system, if conflicting matter identifications and/or organization identifications occur (e.g., more than one applicable selection is present), then the conflicts can be presented to a user for manual selection of the proper matter identification and/or organization identification within the environment of the receiving email system.

Any technique could be used to create the map or reconstruct the map, such as using a hashing algorithm known to both the sending and receiving email systems. Alternatively, each email system can provide a schema of its map to the other email system (e.g., an Extensible Markup Language (XML) schema, a Document Type Definition (DTD), and others). In this way the receiving email system can use the schema of the sending email system to translate and then generate or create the appropriate map.

In still other embodiments, a map could be predetermined and manually maintained, and made accessible to both sending and receiving email systems, such that email messages are automatically assigned to like matter identifications and/or organization identifications on both the sending email system and the receiving email system.

Figure 2:
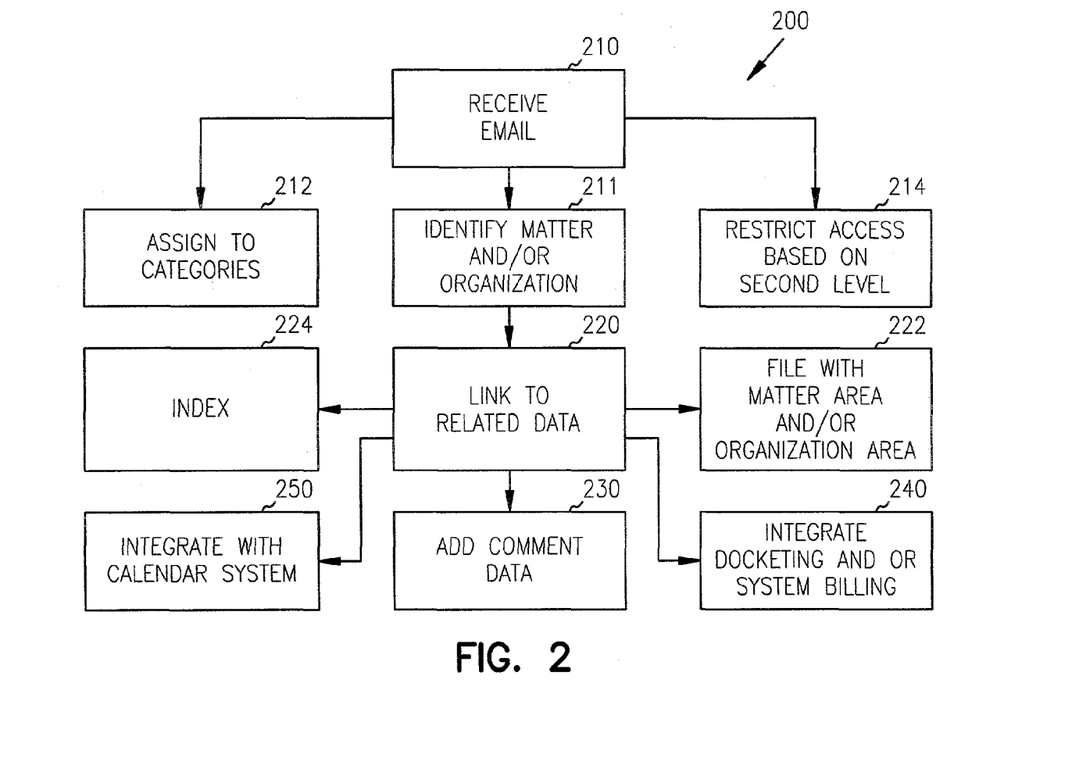
FIG. 2 is a flow diagram of a method to process an email, in accordance with one embodiment of the invention.

FIG. 2 illustrates a flow diagram of one method 200 to process an email, in accordance with one embodiment of the invention. Initially, in 210 an email is received by an email system. The email includes metadata identifying, a subject, a sender, a date received, and the like. In one embodiment, the metadata also includes a matter identification and/or an organization identification. In another embodiment, the metadata is altered to include the matter identification and/or organization identification by using tools provided by the email system. The email system can be any commercially available email system modified to receive and process the matter identification and/or organization identification, or alternatively the email system can be custom developed.

Matter identifications are unique references to projects within an enterprise. Organization identifications are unique references to organizations participating within the enterprise. In one embodiment, the matter identifications are intellectual property law matters. And, the organization identifications are clients and lawyers participating within the enterprise.

In 211, the matter identification and/or organization identification are identified and associated with the received email by the email system. In one embodiment, categories are either automatically assigned or selected and assigned to the email in 212. The categories permit the email to be associated with topics or subjects independent or in connection with the matter identifications and/or organization identifications. Moreover, as one of ordinary skill in the art readily appreciates, the assignment of categories permits the email to be more efficiently acquired during a search and retrieval.

Furthermore, in one embodiment, the metadata associated with the email also includes a security level, such that access to the email is restricted in 214 based on the security level. In this way, a single email can be sent to all individuals associated with a particular matter or a particular organization, but access to the email can be further restricted based on the security level associated with each individual.

Once the email's matter and/or organization are determined, the email is linked to all electronic data associated with the matter and/or organization in 220. As one of ordinary skill in the art appreciates, this permits the email to be filed in 222 into a logical electronic storage area for an enterprise. In some embodiments, these areas are matter areas and organization areas and include personnel data, organization data, matter assignment data, document data, task data, and discussion data. Moreover, the logical linking of the email can exist entirely within the email system, or can be included within the metadata associated with the email, such that a recipient of the email can automatically and directly link to the electronic data associated with the matter and/or organization.

Moreover, in one embodiment, the received email is indexed in 224 and stored in a data store for subsequent search and retrieval. In this way, the received email can be fully integrated into an enterprise's document management system. Further, the metadata as well as any text or attachment data associated with the received email can be indexed.

In another embodiment, the email system provides and input field that receives comment data in 230 from an individual. The comment data is any text desired by the individual to assist the individual with processing the email at some later point in time. Further, the comment data can have a restricted view such that only the individual providing the comment data can access the comment data, or alternatively only selected individuals authorized by the individual are granted access to view the comment data.

In still more embodiments, the email system provides an input field to receive billing data and/or docketing data (e.g., task data) in 240. Any received billing data and/or docketing data can be stored separately from the email, or stored as part of the email's metadata. Also, the billing data and/or docketing data can be stored in a data format that permits the data to be automatically integrated and updated to an enterprise's billing system and/or docketing management systems.

Further, and in some embodiments, in 250 the email system provides an input field to receive appointment data. Any received appointment data permits the email system to schedule or integrate with a calendar system of an enterprise. In this way, when a received email is appropriately accepted the appointment data is placed on an appropriate calendar. Of course as one of ordinary skill in the art readily appreciates, if a sender of the received email has an appropriate security authorization to automatically place appointments on a receiver's calendar, then no acceptance is required at all to place the appointment on the calendar.

Figure 3:
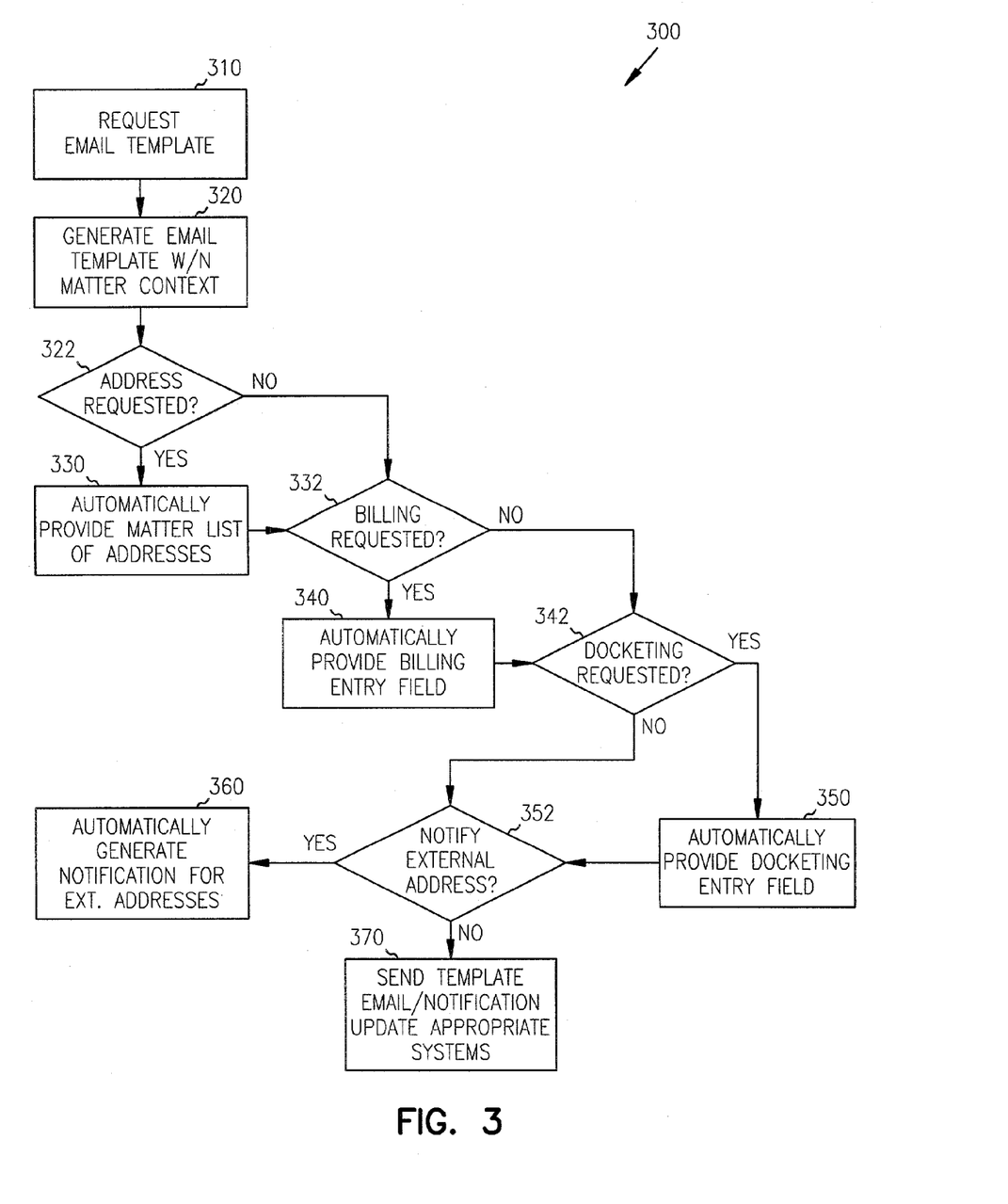
FIG. 3 is a flow diagram of a method to construct an email, in accordance with one embodiment of the invention.

FIG. 3 illustrates a flow diagram of one method 300 to construct an email, in accordance with one embodiment of the invention. In 310, a request within an email system is received to generate a template email. The request can be associated with a reply request to an existing email, a forward request to an existing email, or a new request for a newly desired template email. Moreover, the request is made within a matter context, such that the email system can readily identify a particular matter associated with the request prior to generating the template email.

In 320, after the request is received, the email system generates the template email within the matter context and associates metadata having a matter identification with the generated template email. Next, the email system automatically makes available a matter list of email addresses associated or otherwise assigned to the matter context. The matter list represents selectable email addresses that can be potential recipients of the generated template email. In 322, a check is made to determine if the email system was requested to provide the matter list of email addresses, and if so, in 330 the email system automatically provides the matter list of email addresses for selection.

In some embodiments, the email system checks in 332 to determine if a billing record was requested with the template email, and if so, in 340 the email system automatically provides an entry field for receiving a billing time and a billing description that is to be associated the template email. Moreover, once the email is sent from the email system, if any populated billing record is present with the template email, then eventually in 370 the entered billing time and the entered billing description are integrated and updated to an enterprise's billing system.

In yet more embodiments, the email system checks in 342 to determine if a docketing (e.g., task) record was requested with the template email, and if so, in 350 the email system automatically provides an entry field for receiving a docketing entry associated with the template email. The docketing entry can include a docketing assignment date, a docketing due date, and a docketing task description. Further, once the email is sent from the email system, if any populated docketing record is present with the template email, then eventually in 370 the entered docketing entry is integrated and updated to an enterprise's docketing system.

In still other embodiments, the email system checks in 352 to determine if a request to notify external email addresses (e.g., external to the email system) was received. In these embodiments, the email system automatically provides with the template email a selection that permits the template email to be sent as a notice to external email addresses. In this way, external email addresses can receive a notification that the template email was sent to an internal email address (e.g., local to the email system). In one embodiment, the notification includes a direct link to associate the notification with the email system, and thereby link an individual to an individual's internal email mailbox within the email system in order to view the internally sent template email. Further, the email system can be configured to automatically forward any email sent to an internal address, to a previously configured external address. If a request to notify external email addresses is received and the template email is sent, then in 370 the notice is sent to any desired external addresses.

Moreover, and in one embodiment, the email system can provide options for scheduling meetings on a calendar system within the enterprise. Also, the email system can permit a receipt notification to be sent back to the original individual requesting the template email when one or more recipients of the template email open and view any sent template email.

In another aspect of the present specification, the email system permits attachment data associated with the matter context to be selectively linked and otherwise attached to the template email. And, since the template email is generated within the matter context, all electronic data associated with the matter context is readily available to the email system to provide for selection.

Figure 4:
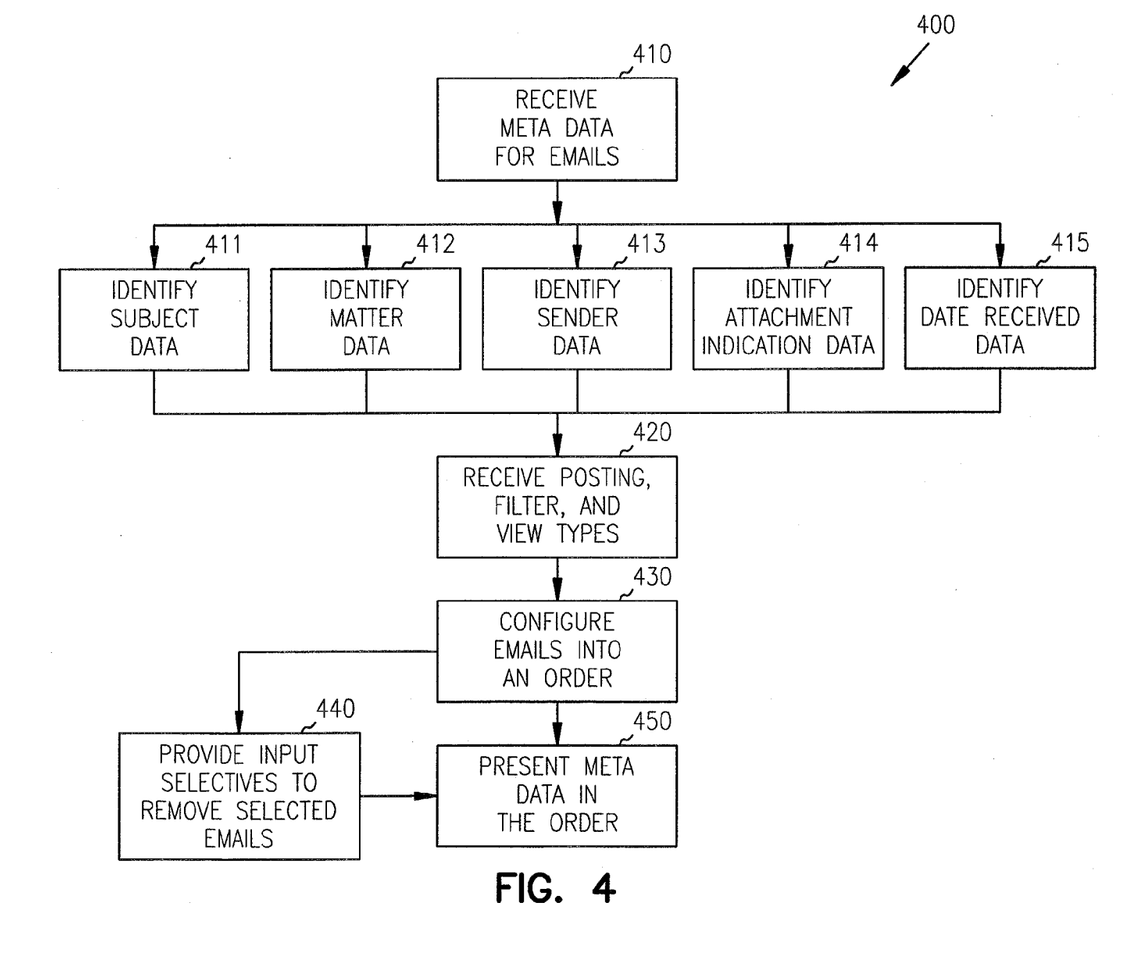
FIG. 4 is a flow diagram of a method to present emails, in accordance with one embodiment of the invention.

FIG. 4 illustrates a flow diagram of one method 400 to present emails, in accordance with one embodiment of the invention. An email system manages mailboxes for one or more internal email accounts. Received emails are displayed in an abbreviated format for ready discernment of an individual having one or more of the email accounts. Any received emails include metadata, text, and/or attachment data. The metadata, by way of example only, includes subject data, matter data, sender data, attachment indication data, and a date received data.

Initially, emails are received in 410 and the metadata associated with the received emails are identified, acquired, or parsed from the received emails. Accordingly, in 411 subject data is identified, in 412 matter data is identified, in 413 sender data is identified, in 414 attachment indication data is identified, and in 415 date received data is identified. The metadata also includes a link to a complete email that is received. The metadata is stored in a table, such that each entry within the table represents a single received email.

Moreover, in some embodiments, the email system provides options on a display for an individual's selection that permits the restrictive display or ordering of the metadata entries within the display. The options can be configured by an individual's selection of the options. In some embodiments, the options include a posting type, a filter type, and a view type. The posting type includes a general matters category, a specific matters category, a status category, a billing category, an engagement category, a correspondent category, and a post-all messages category. The filter type includes a flagged messages category (e.g., defined by an individual), a new messages category, a sent messages category, and a received messages category. The view type includes a dismissed messages category and a non-dismissed messages category.

Any selected options are received in 420 by the email system, and the appropriate received emails, being managed by the email system, are configured into an order based on the selected options in 430. Moreover, in one embodiment, the email system provides an input selection next to each metadata entry in 440 that when activated permits any email associated with the metadata entry and the metadata entry itself to be removed from the table and the display.

In 450, the table having the metadata entries is presented within the display in the configured order, based on the options selected and any activated input selection. Moreover, each column of the presented table represents one or more of the metadata types (e.g., subject data, matter data, sender data, attachment indication data, and date received data). These columns include a descriptive header identifying the metadata types, and the header is selectable to also generate a desired order. For example, a column header presented within the display represented as "date received" can be selected a first time to place all metadata entries in an order where the most recently received email's metadata is listed first, and if the data received column header is selected a second time a new order lists the first received email's metadata first in the presented table.

In one embodiment, the matter data includes a matter identification and a matter title. Further, the matter data provides links to an enterprise's electronic data associated with the matter identification. In some cases, this data includes, billing data, assignment data, personnel data, organization data, contact data, docketing data, document data, and the like. Also, in some embodiments the attachment indication data is an integer number that depicts a total number of attachments associated with each of the received emails within the presented table. For example, if a received email includes 3 attachments, then the attachment indication data associated with the received email will be presented within the table as "3." In this way, an individual can rapidly discern an exact number of attachments associated with an email, without having to first open and otherwise access the email to discover the exact number of attachments.

Figure 5:
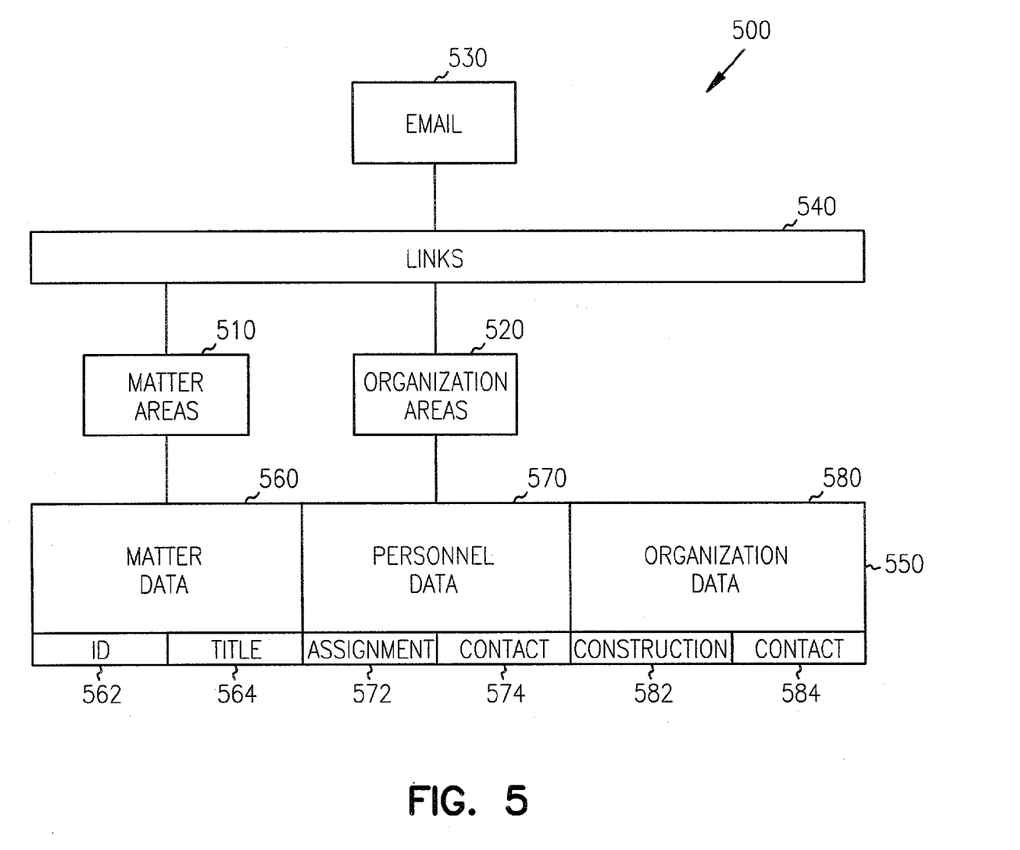
FIG. 5 is a diagram of an email system, in accordance with one embodiment of the invention.

FIG. 5 illustrates a diagram of one email system 500, in accordance with one embodiment of the invention. The email system 500 includes matter areas 510 and organization areas 520. Moreover, an email 530 is linked to the matter areas 510 and/or organization areas 520 through links 540. The links 540 can be embedded in metadata associated with the email 530, of can be logically resolved by the email system 500 upon receipt or construction of the email 530.

In one embodiment, the matter areas represent enterprise projects, such as an intellectual property project, where the enterprise includes clients, lawyers, and other service providers. The email system 500 is embodied as an extranet over the WWW, and personnel participating within the enterprise collaborate with one another through the extranet. And, the interface to the email system 500 includes interactive web pages that interface the personnel to the email system 500.

In still more embodiments, the areas 510 and 520 are linked to an enterprise's electronic data 550 and systems. In this way, once the email 530 is linked to an appropriate matter area 510 and/or organization area 520 using links 540, and an individual consuming the email 530 has complete access to all relevant enterprise data 550 associated with the email 530.

The matter areas 510 and the organization areas 520 include, by way of example only, matter data 560 having a matter identification 562 and a matter title 564, personnel data 570 having assignment data 572 and contact data 574, and organization data 580 having organization instruction data 582 and organization contact data 584. Furthermore, in some embodiments, the email 530 is interfaced to an enterprise's billing system, calendar system, document management system, and docketing system through the links 540 to the matter areas 510 and the organization areas 520.

Figure 6:
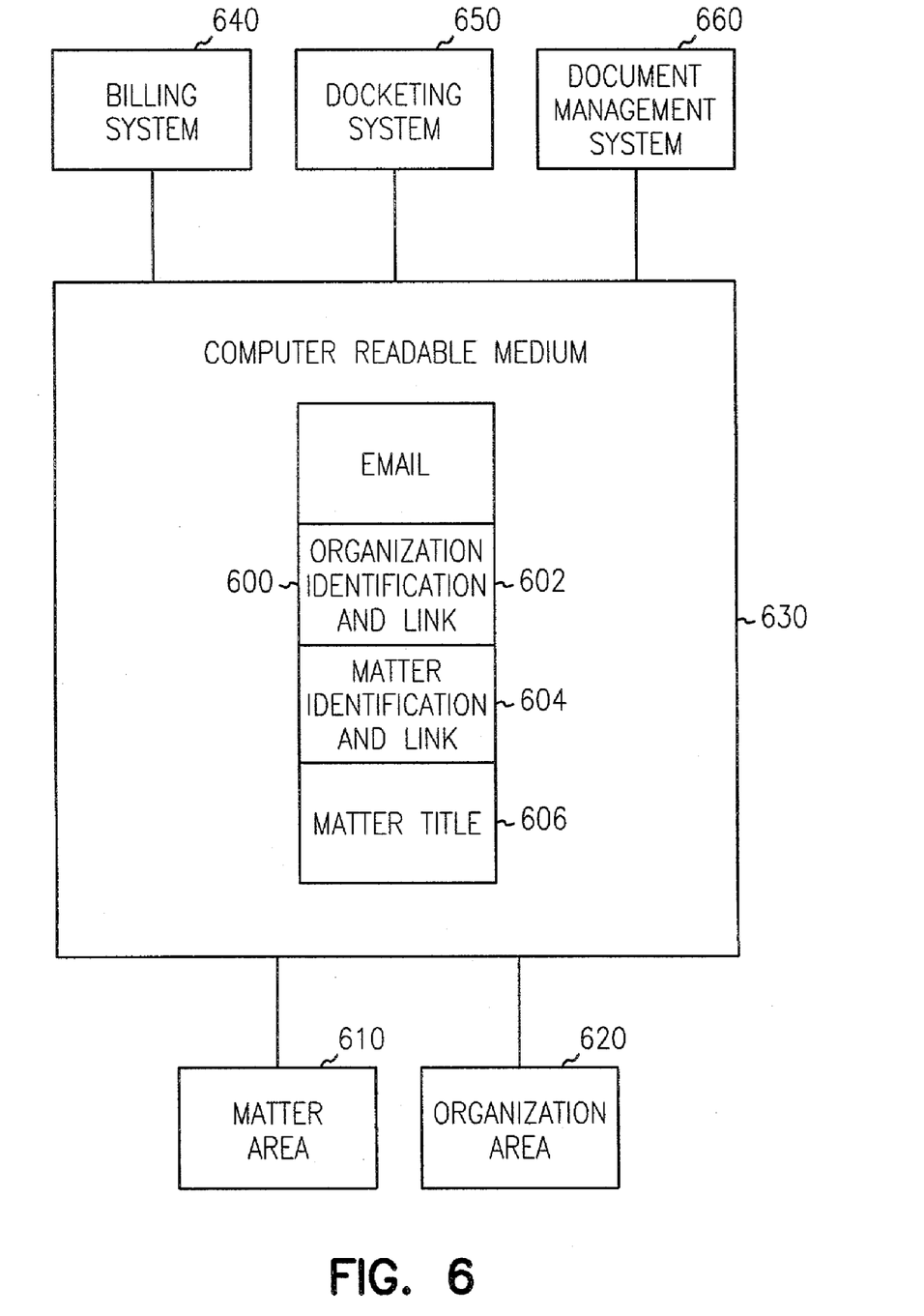
FIG. 6 is a block diagram of an email, in accordance with one embodiment of the invention.

FIG. 6 illustrates a block diagram of one email 600, in accordance with one embodiment of the invention. The email 600 includes an organization identification link 602, a matter identification link 604, and a matter title 606. The links (e.g., 602 and 604) provide the email 600 direct accesses to a matter area 610 and/or an organization area 620. Furthermore, the email 600 resides on or is otherwise accessible from a computer readable medium 630. Of course as one of ordinary skill in the art readily recognizes, the email 600 can reside on multiple computer readable media, and the media can be volatile or non-volatile memory.

The email 600 uses the matter identification link 604 to access and integrate with the matter area 610. Likewise, the email 600 uses the organization identification link 602 to access and integrate with the organization area 620. The areas (e.g., 610 and 620) provide access to an enterprise's electronic data and systems (e.g., 640, 650, and 660). And, in one embodiment the email 600 includes a billing time and a billing description, such that the email 600 uses the matter identification link 604 to automatic update and integrate with an enterprise's billing system 640. In another embodiment, the email 600 includes a docketing date and a docketing description, such that the email 600 uses the matter identification link 604 to automatically update and integrate with the enterprise's docketing system 650. In still more embodiments, the email 600 includes index data that represents the email's 600 content and metadata, such that the email 600 can automatically update and integrate with the enterprise's document management system 660.

Further, the matter area 610 represents projects associated with an enterprise. And, in one embodiment, the matter area 610 is a legal matter, such as an intellectual property legal matter where the organization area 620 represents clients and/or law firms associated with the matter area 610. In this way clients, lawyers, law firms, and service providers all collaborate with each other using email 600 of the present specification on a specified project associated with email 600.

One of ordinary skill in the art will understand, upon reading and comprehending this disclosure, the manner in which software instructions can be written and installed to execute on one or more processors in a computer-based system to perform the methods disclosed herein. One of ordinary skill in the art will further understand that various programming languages may be employed to create software instructions designed to implement and perform the methods and systems of the present disclosure. For example, the programs can be structured in an object-orientation using an object-oriented language such as Java, Smalltalk or C++, and the programs can be structured in a procedural-orientation using a procedural language such as Pascal, COBOL, C, assembler, or micro-code. The software components communicate in any of a number of ways that are well known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present disclosure are not limited to a particular programming language or any particular programming environment.

It is to be understood that the above description is intended to be illustrative, and not restrictive. Many other embodiments will be apparent to one of ordinary skill in the art upon reviewing the above description. The scope of embodiments of the invention should, therefore, be determined with reference to the appended claims, along with the full scope of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method to process an electronic mail message (email), comprising:

receiving the email, within and as part of an electronic mail service, which is an email system having an email client and an email server, wherein the email is associated with at least one of a matter and an organization, and wherein the email is processed and handled within the electronic mail service; and linking the email to at least one of the matter and the organization, wherein the matter and the organization include at least one of personnel data, organization data, assignment data, document data, task data, and discussion data, wherein the email is linked via metadata of the email, which is recognized by the electronic mail service, and wherein the metadata includes at least one of a matter identification and an organization identification, which permit the linking of the email to the matter or the organization, and the metadata also includes a subject of the email, and the metadata is modifiable by the email client or email server to include or change the matter identification or the organization identification.

2. The method of claim 1 wherein in receiving, the matter is an intellectual property matter.

3. The method claim 1 wherein in linking, the email is filed to at least one of a matter area and an organization area.

4. The method of claim 1 further comprising indexing the email for subsequent search and retrieval.

5. The method of claim 1 further comprising assigning the email to one or more categories.

6. The method of claim 1 further comprising restricting access to the email based on a security level associated with the email.

7. The method of claim 1 further comprising adding comment data to the email.

8. The method of claim 1 further comprising integrating the email with a calendar system when the email is associated with an appointment.

9. The method of claim 1 further comprising integrating the email with a docketing system using the task data.

10. A method to construct a template electronic mail message (email), comprising:

generating, within an electronic mail service represented by an email client and an email server, the template email within a matter context after receiving a request, wherein the matter context is related to a classification associated with the matter context, and wherein the classification is part of metadata associated with the template email and is included with a subject identification that is subsequently associated with the template email, and the classification is modifiable within the metadata; and automatically providing a matter list of email addresses associated with the matter context, within the electronic mail service, wherein the matter list of email addresses represent potential receivers of the template email, and wherein the potential receivers are acquired in response to the classification and have been previously assigned to that classification.

11. The method of claim 10, further comprising:

automatically providing an entry field for receiving a billing time and a billing description associated with the template email; and integrating the billing time and the billing description with a billing system when the template email is sent.

12. The method of claim 10, further comprising:

sending the template email to one or more internal addresses; and concurrently sending a notification email to one or more external addresses indicating that the template email was sent to one or more of the internal addresses.

13. The method of claim 10 further comprising permitting attachment data associated with the matter context to be selectively linked and sent with the template email.

14. The method of claim 10, further comprising:

automatically providing an entry field for receiving a docketing entry; and integrating the docketing entry with a docketing system when the template email is sent.

15. A method of presenting electronic mail messages (emails), comprising:

receiving, by an email service having an email client and an email server, metadata for one or more emails in a table, wherein the metadata includes subject data, matter data, sender data, attachment indication data, and date received data, and wherein the matter data is associated with one or more classifications to which the one or more emails are assigned, and wherein the metadata is carried with the one or more emails and includes subjects for the one or more emails and the metadata is modifiable;

configuring, within the electronic mail service, the one or more emails in an order within the table based on at least one of a posting type, a filter type, and a view type; and presenting, within the electronic mail service, the metadata for each of the one or more emails within the table in the configured order.

16. The method of claim 15 wherein in receiving, the matter data includes a matter identification and a matter title.

17. The method of claim 15 wherein in configuring, the posting type includes at least one of a general matters category, a specific matters message category, a status category, a billing category, an engagement category, a correspondent category, and a post-all messages category.

18. The method of claim 15 wherein in configuring, the filter type includes at least one of a flagged messages category, a new messages category, a sent messages category, and a received messages category.

19. The method of claim 15 wherein in configuring, the view type includes at least one of a dismissed messages category and a non-dismissed messages category.

20. The method of claim 15 further comprising providing an input selection for each of the one or more emails presented within the table, wherein the input selection when activated is used to retain or remove a number of the one or more emails from the table.

21. The method of claim 15 wherein in receiving, the attachment indication data is an integer number depicting a total number of attachments associated with each of the one or more emails within the table.

22. An electronic mail (email) system, comprising:

matter areas associated with classifications assigned to email, wherein the matter areas are represented in metadata associated with the email and that metadata also includes a subject for the email, and wherein the metadata is modifiable by an email service that includes an email client and an email server;

organization areas; and wherein the email is linked to at least one of the matter areas and the organization areas, and wherein the email is processed within the electronic mail service and the links recognized and integrated within the electronic mail service.

23. The email system of claim 22, wherein the matter areas are intellectual property matter areas.

24. The email system of claim 22, wherein the areas are associated with matter data including a matter identification and a matter title, personnel data including assignment data and personnel contact data, and organization data including organization instruction data and organization contact data.

25. The email system of claim 22, wherein the email is interfaced to at least one of a billing system and a docketing system.

26. An electronic email message (email) residing on a computer readable medium, comprising:

a matter identification;

a matter title;

an organization identification; and wherein the email is linked to at least one of a matter area and an organization area using at least one of the matter identification and the organization identification, and wherein the email is processed by an email service, and wherein the links are also handled by the email service, and the matter identification, the matter title, and the organization identification are included within metadata carried with the email and that metadata also includes a subject associated with the email, and the metadata is modifiable by the email service.

27. The email of claim 26 further comprising a billing time and a billing description to automatically update a billing system using the matter identification.

28. The email of claim 26 further comprising a docketing date and a docketing description to automatically update a docketing system using the matter identification.

29. The email of claim 26 further comprising an index data representing the email to automatically update a document management system using at least one of the matter identification and the organization identification.

30. The email of claim 26, wherein the matter identification is a legal matter identification.

31. The email of claim 29, wherein the legal matter identification is an intellectual property legal matter identification.

* * * * *